Reissued Dec. 7, 1943 Re. 22,402

UNITED STATES PATENT OFFICE 22,402

COATING COMPOSITION CONTAINING POLYVINYL ACETATE METHYLAL

Robert C. Swain, Riverside, and Pierrepont Adams, Glenbrook, Conn., assignors to American Cyanamid Company, New York, N. Y., a corporation of Maine No Drawing. Original No. 2,326,698, dated August 10, 1943. Serial No. 371,783, December 26, 1940. Application for reissue September 27, 1943, Serial No. 504,000

3 Claims. (Cl. 260—42)

This invention relates to coating compositions containing polyvinyl acetate methylal and melamine-formaldehyde resins.

An object of this invention is to improve the physical and chemical properties of coating compositions containing polyvinyl acetate methylal, e. g., chemical resistance such as acid resistance, heat resistance, etc.

Another object of this invention is to provide compositions containing polyvinyl acetate methylal and compatible proportions of compatible melamine-formaldehyde resins.

These and other objects are attained by blending polyvinyl acetate methylal with not more than about 40% (total solids weight basis) of a melamine-formaldehyde resin which has been alkylated with a butyl alcohol or benzyl alcohol wherein the molal ratio of formaldehyde to melamine is at least about 4:1.

The following examples in which the proportions are in parts by weight are given by way of illustration and not in limitation.

The polyvinyl acetate methylal used in the following examples is a product sold under the trade name of "Formvar" by Shawinigan Products Corporation. Polyvinyl acetate methylal resins may be produced by reacting polyvinyl acetate with formaldehyde as described for example in the patent to Morrison et al., U. S. Reissue No. 20,430.

*Example 1*

| | Parts |
|---|---|
| Melamine-formaldehyde resin "A" | 10 |
| Polyvinyl acetate methylal ("Formvar") | 90 |

A composition containing these ingredients is prepared by admixing 20 parts of melamine-formaldehyde resin "A" solution (50% resin) with 900 parts of "polyvinyl acetate methylal stock solution" (containing 10% of polyvinyl acetate methylal and 90% of dioxane). Films of the composition are applied to metal objects and baked at a temperature of about 135° C. for about one-half hour. The product is a hard, transparent coating having good film strength.

*Example 2*

| | Parts |
|---|---|
| Melamine-formaldehyde resin "B" | 25 |
| Polyvinyl acetate methylal ("Formvar") | 75 |

A composition containing these ingredients is prepared by admixing 50 parts of melamine-formaldehyde resin "B" solution (50% resin) with 750 parts of "polyvinyl acetate methylal stock solution." Films of the composition are applied to metal objects and baked at a temperature of about 135° C. for about one-half hour. A clear, tough film is formed.

*Example 3*

| | Parts |
|---|---|
| Melamine-formaldehyde resin "C" | 10 |
| Polyvinyl acetate methylal ("Formvar") | 90 |

A composition containing these ingredients is prepared by admixing 20 parts of melamine-formaldehyde resin "C" solution (50% resin) with 900 parts of "polyvinyl acetate methylal stock solution." Films of the composition are applied to metal objects and baked at a temperature of about 135° C. for about one-half hour. The product formed is a very hard, clear coating.

*Example 4*

| | Parts |
|---|---|
| Melamine-formaldehyde resin "D" | 25 |
| Polyvinyl acetate methylal ("Formvar") | 75 |

A composition containing these ingredients is prepared by admixing 50 parts of melamine-formaldehyde resin "D" solution (50% resin) and 750 parts of "polyvinyl acetate methylal stock solution." Films of the composition are applied to metal objects and baked at a temperature of about 135° C. for about one-half hour. A water-white film having good chemical properties is formed.

*Preparation of melamine-formaldehyde resin "A"*

| | Parts |
|---|---|
| Melamine (1 mol) | 126 |
| Formalin (4 mols) (37% formaldehyde in water | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of malamine-formaldehyde resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "D"*

| | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93–95° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 95–90° C. and the resin solution is concentrated to about 60–70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. The condensation may be carried out either with or without an acid catalyst and in some instances basic catalysts may desirably be utilized.

The melamine-formaldehyde resins vary slightly according to minor variations of control during their production and in some instances small proportions of a suitable solvent material, e. g., dioxane, acetone, acetone-alcohol mixtures, the monoethyl ether of ethylene glycol ("Cellosolve"), etc., may be added to the original solutions of polyvinyl acetate methylal and melamine-formaldehyde resin in order to produce perfectly clear solutions if such solutions are not originally obtained.

While formaldehyde has been used in the previous examples, it will be obvious that other aldehydes such as the various polymers of formaldehyde, e. g., paraformaldehyde, or substances which yield formaldehyde may be used in place of part or all of the formaldehyde.

As indicated by the above examples polyvinyl acetate methylal has been found to be compatible with not more than about 40% of a melamine-formaldehyde resin alkylated with butyl and benzyl alcohols, wherein the molal ratio of formaldehyde to melamine is at least about 4:1. Melamine-formaldehyde resins which have been alkylated with hexyl and octyl alcohols are compatible with polyvinyl acetate methylal in proportions up to about 10% and butylated melamine-formaldehyde resins wherein the molal ratio of formaldehyde to melamine is 5:1 are compatible in proportions as high as about 60%. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. The percentage composition in each instance in this paragraph is on a total solids weight basis.

The melamine-formaldehyde resins may be alkylated with benzyl alcohol and with n-butyl alcohol as in the above examples or they may be alkylated with other butyl alcohols or mixtures of any of these alcohols. The term "alkylated melamine-formaldehyde resin" is intended to denote compositions which are reacted with an alcohol.

Our products may be plasticized with a wide variety of materials such as the alkyl phthalates, tricresyl phosphate, fatty acid amides, various alkyd resins, etc.

Various fillers, pigments, dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, phenol-formaldehyde resins, alkyd resins, ethyl cellulose, cellulose acetate, nitrocellulose, etc., as well as in varnishes, especially drying oil varnishes, such as those from tung oil, linseed oil, etc.

Our products may be used in lacquers and other coating compositions including enamels, paints, etc. They are particularly suitable for wire coating and for the production of insulating materials. Our mixtures may be applied to paper, cloth and the like and the resulting product may be used for a wide variety of purposes. Films of our materials may be used in the production of photographic films. Our compositions are also suitable as adhesives such as for shatterproof glass and they may also be used in the manufacture of filaments, sheets, etc.

The melamine-formaldehyde resins improve the chemical resistance such as acid resistance, of polyvinyl acetate methylal resins and our mixtures have improved color retention upon heating. Another important improvement in polyvinyl acetate methylal resins which is achieved by the incorporation of melamine-formaldehyde resins is the reduction in the thermoplasticity thereof. In some instances the polyvinyl acetate methylal resin may exhibit a toughening effect upon the melamine-formaldehyde resins.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing polyvinyl acetate methylal and a melamine-formaldehyde resin which has been heated until reacted with an alcohol selected from the group consisting of butyl alcohols and benzyl alcohol, wherein the molal ratio of formaldehyde to melamine is at least about 4:1 and wherein the weight ratio of polyvinyl acetate methylal to melamine resin is at least about 3:2.

2. A coating composition containing polyvinyl acetate methylal and a melamine-formaldehyde resin which has been heated until reacted with n-butyl alcohol, wherein the molal ratio of formaldehyde to melamine is at least about 4:1 and wherein the weight ratio of polyvinyl acetate methylal to melamine resin is at least about 3:2.

3. A coating composition containing polyvinyl acetate methylal and a melamine-formaldehyde resin which has been heated until reacted with benzyl alcohol, wherein the molal ratio of formaldehyde to melamine is at least about 4:1 and wherein the weight ratio of polyvinyl acetate methylal to melamine resin is at least about 3:2.

ROBERT C. SWAIN.
PIERREPONT ADAMS.

CERTIFICATE OF CORRECTION.

Reissue No. 22,402. December 7, 1943.

ROBERT C. SWAIN, ET AL.

It is hereby certified that error appears in the printed specification of the above numbered patent requiring correction as follows: Page 2, second column, line 28, for "95-90° C." read --85-90° C.--; and that the said Letters Patent should be read with this correction therein that the same may conform to the record of the case in the Patent Office.

Signed and sealed this 8th day of February, A. D. 1944.

(Seal)

Henry Van Arsdale,
Acting Commissioner of Patents.